United States Patent
Lee et al.

(10) Patent No.: US 8,009,624 B2
(45) Date of Patent: Aug. 30, 2011

(54) METHOD FOR FRACTIONAL FRQUENCY REUSE WITH ORDERING SCHEME TO INCREASE CAPACITY OF OFDM SYSTEMS

(75) Inventors: Tae Jin Lee, Suwon-si (KR); Seung Moo Cho, Namyangju-si (KR)

(73) Assignee: Sungkyunkwan University Foundation For Corporate Collaboration, Cheoncheon-Dong, Jangan-Gu, Gyeonggi-Do, Suwon (KR)

( * ) Notice: Subject to any disclaimer, the term of this patent is extended or adjusted under 35 U.S.C. 154(b) by 453 days.

(21) Appl. No.: 12/371,974

(22) Filed: Feb. 17, 2009

(65) Prior Publication Data

US 2010/0067455 A1    Mar. 18, 2010

(30) Foreign Application Priority Data

Sep. 18, 2008 (KR) .......................... 10-2008-0091670

(51) Int. Cl.
*H04W 72/04* (2009.01)
(52) U.S. Cl. ........................................ 370/329; 370/252
(58) Field of Classification Search ................. 370/252, 370/328; 375/267, 265
See application file for complete search history.

(56) References Cited

U.S. PATENT DOCUMENTS

| | | | | |
|---|---|---|---|---|
| 6,556,830 B1 * | 4/2003 | Lenzo | | 455/450 |
| 7,835,319 B2 * | 11/2010 | Sugar | | 370/328 |
| 7,970,072 B2 * | 6/2011 | Oh et al. | | 375/265 |
| 2010/0097949 A1 * | 4/2010 | Ko et al. | | 370/252 |
| 2011/0116566 A1 * | 5/2011 | Takahashi et al. | | 375/267 |

FOREIGN PATENT DOCUMENTS

KR    10-2008-0015355    2/2008

* cited by examiner

*Primary Examiner* — Thong Vu
(74) *Attorney, Agent, or Firm* — Lexyoume IP Group, PLLC.

(57) ABSTRACT

Disclosed herein is a method for fractional frequency reuse with ordering scheme (FFRO) to increase capacity of orthogonal frequency division multiplexing (OFDM) systems while reducing interference due to the use of a common sub-channel set. Each cell includes a common sub-channel set assigned in common to all cells provided in a cluster and a dedicated sub-channel set assigned differently to all of the cells. The method includes classifying the cells into at least one type according to cluster sizes, and allocating the dedicated sub-channel set by frequency partitioning scheme based on the cell type.

7 Claims, 7 Drawing Sheets

METHOD FOR FRACTIONAL FRQUENCY REUSE WITH ORDERING SCHEME TO INCREASE CAPACITY OF OFDM SYSTEMS

CROSS-REFERENCE TO RELATED APPLICATION

This application claims priority to and the benefit of Korean Patent Application No. 10-2008-0091670 filed in the Korean Intellectual Property Office on Sep. 18, 2008, the entire contents of which are incorporated herein by reference.

BACKGROUND OF THE INVENTION

1. Field of the Invention

The present invention relates to a method for frequency reuse, and more particularly to a method for fractional frequency reuse with ordering scheme to increase capacity of orthogonal frequency division multiplexing (OFDM) systems.

2. Description of the Related Art

Growth of wireless subscribers and proliferation of multimedia services has increased demand for bandwidth in wireless access. Therefore, next-generation wireless access networks require an advanced technique that has the ability to mitigate frequency selective fading in wideband communications and to utilize the frequency spectrum efficiently. Orthogonal frequency division multiplexing (OFDM) is considered one of the best solutions to satisfy these requirements. In wireless cellular communication systems, cell clustering is often used to reduce the effects of co-channel interference (CCI) from neighboring cells. To increase the efficiency of a system, the frequency reuse factor should be close to 1.

Reduction of CCI, however, is achieved at the cost of reduced cell capacity. To mitigate such tradeoffs, some techniques such as sectoring, reuse partitioning and fractional frequency reuse (FFR) have been studied.

Sectoring uses directional antennas to increase cell capacity, and reuse partitioning uses multiple reuse factors. Overlaid cells are implemented for reuse partitioning to increase the capacity of a system and to reduce the CCI. In FFR, constraints on usable sets of channels balance the tradeoff between cell capacity and interference. Thus, conventional FFR has a problem of restricting the spectrum effect of a system since there are many constraints on sub-channel sets used in every cell.

SUMMARY OF THE INVENTION

The present invention is conceived to solve the problems of FFR as described above, and an aspect of the present invention is to provide a method for fractional frequency reuse with ordering scheme (FFRO) to increase capacity of orthogonal frequency division multiplexing (OFDM) systems. Specifically, the present invention is directed to an FFRO method capable of increasing capacity of OFDM systems while reducing co-channel interference (CCI) in a common sub-channel set assigned to every cell.

According to an aspect of the present invention, there is provided a method for fractional frequency reuse with ordering scheme (FFRO) to increase capacity of orthogonal frequency division multiplexing (OFDM) systems, in which the frequency includes a common sub-channel set assigned in common to all cells provided in a cluster and a dedicated sub-channel set assigned differently to all of the cells, the method including: classifying the cells into at least one type according to cluster sizes; and allocating the dedicated sub-channel set by frequency partitioning scheme based on the cell type.

The number of cell types may be equal to the cluster size. Further, the allocating the dedicated sub-channel set by the frequency partitioning scheme based on the cell type may include: indexing all sub-carriers of each cell in a sequential manner; and partitioning every sub-carrier into 2M sub-channel sets by performing modulo M operations on an index number thereof, where M is the cluster size.

The partitioning every sub-carrier into 2M sub-channel sets by performing modulo M operations on an index number thereof may include partitioning the sub-carrier with regard to a common sub-channel set $F_m$ through operation of $F_m = \{f_i | i \bmod M = m-1, 1 \leq i \leq pN\}$, $1 \leq m \leq M$, where fi and p are an index i sub-carrier and a ratio of the common sub-channel to total sub-channels, respectively.

The partitioning every sub-carrier into 2M sub-channel sets by performing modulo M operations on an index number thereof may include: partitioning the sub-carrier with regard to a dedicated sub-channel set $F_m$ through operation of $$F_m = \{f_i | i \bmod M = m - M - 1,\ pN < i \leq N\},\ M < m \leq 2M.$$

The method may further include allocating the sub-channels in a specific order for the cell type s after partitioning every sub-carrier into 2M sub-channel sets by performing modulo M operations on an index number thereof, the specific order being as follows:

Type s: $F_{M+s} \to F_{(s) \bmod M} \to F_{(s+1) \bmod M} \to F_{(s+2) \bmod M} \to \cdots \to F_{(s+M-1) \bmod M}$ where $s \in \{1, 2, \ldots, M\}$.

For a cluster size of M=3, the respective sub-channel sets represented by $F_1, F_2, F_3, F_4, F_5$ and $F_6$ may be allocated to a user in order of Type 1: $F_4 \to F_1 \to F_2 \to F_3$, Type 2: $F_5 \to F_2 \to F_3 \to F_1$, and Type 3: $F_6 \to F_3 \to F_1 \to F_2$.

BRIEF DESCRIPTION OF THE DRAWINGS

The above and other aspects, features and advantages of the present invention will become apparent from the following description of a preferred embodiment given in conjunction with the accompanying drawings, in which.

DETAILED DESCRIPTION OF THE EMBODIMENT

Exemplary embodiments of the present invention will be described in detail with reference to the accompanying drawings.

First, conventional fractional frequency reuse (FFR) will be described hereinafter.

Mobile WiMAX allows a reuse factor of 1 to accommodate more subscribers. In this environment, some techniques are required to support quality of service (QoS) when all cells use the same frequency channels. FFR is a way of mitigating such a problem. Studies on FFR are divided into three categories such as frequency partitioning, sub-channel allocation, and reuse set management algorithm.

First, frequency partitioning is a procedure that classifies sub-channel sets. It is related to cell clustering and determines the usable sub-channel sets for each cell. Secondly, sub-channel allocation serves to determine how many sub channels are allocated among the total sub-channel sets. Thirdly, the reuse set management algorithm deals with the problem of how reuse set is managed statically or dynamically.

Figure 1:
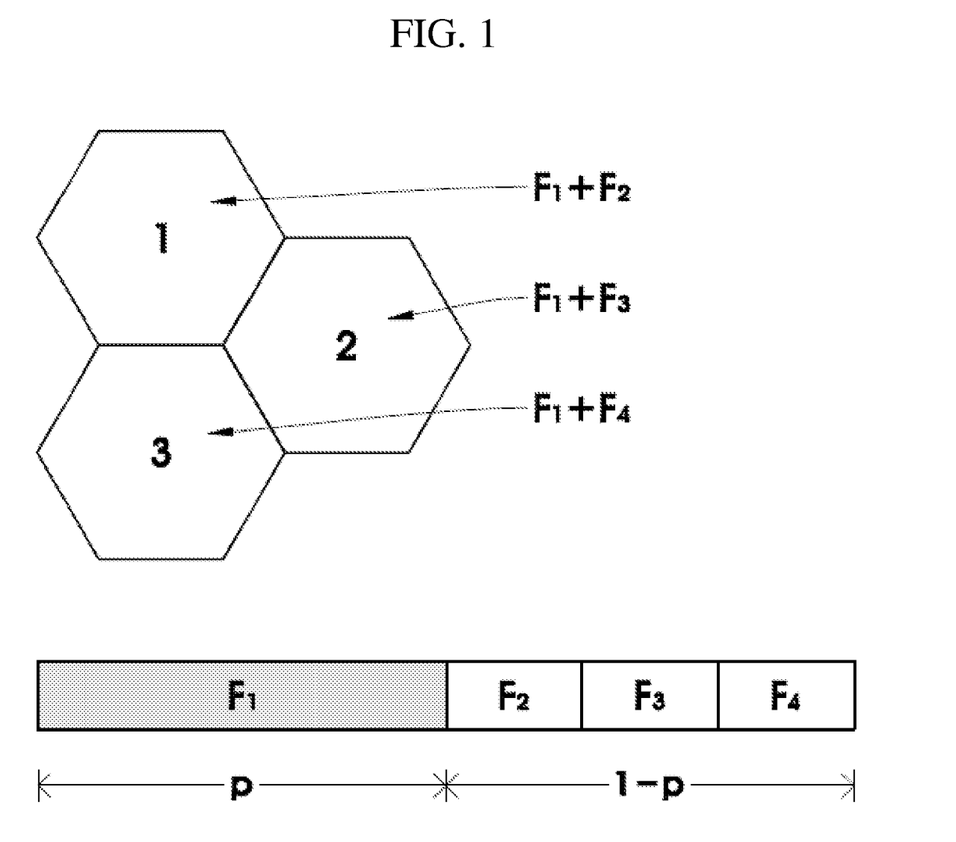
FIG. 1 shows frequency partitioning in conventional fractional frequency reuse (FFR)
Figure 2:
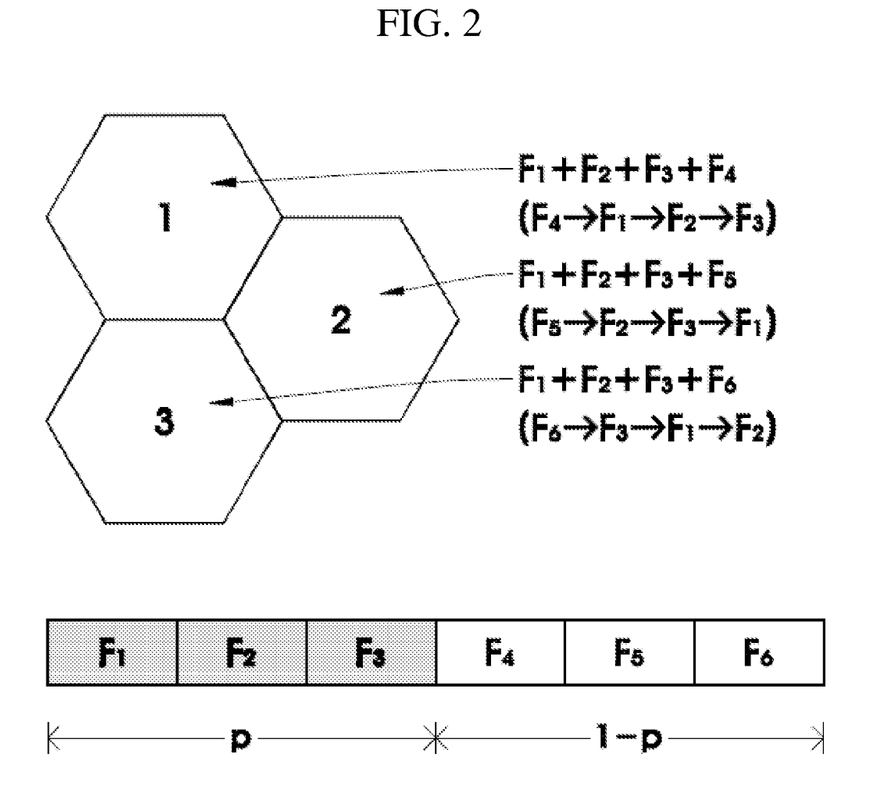
FIG. 2 shows frequency partitioning in fractional frequency reuse with ordering scheme (FFRO) according to an exemplary embodiment of the present invention.

FIGS. 1 and 2 show an example of the frequency partitioning in a conventional FFR. Referring to FIG. 1, usable sets of sub-channels for each cell are determined by frequency partitioning scheme. Further, the usable sub-channel sets are of two different types; one is a common sub-channel set ($F_1$) assigned to every cell, and the other is a dedicated sub-channel set ($F_2$, $F_3$ or $F_4$) assigned to particular cells. Although the dedicated sub-channel sets reduce the effect of interference, co-channel interference (CCI) from tier-1 cells still remains in the case of the common sub-channel sets.

Next, the fractional frequency reuse with ordering scheme (FFRO) according to an exemplary embodiment of the present invention will be described.

FFRO according to an exemplary embodiment of the present invention is proposed as a new and efficient frequency partitioning technique for FFR to reduce the amount of interference in the common sub-channel sets. FFRO will be described with reference to FIG. 2.

FIG. 2 shows frequency partitioning in FFRO according to the exemplary embodiment of the invention. As shown in FIG. 2, each cell has common sub-channel sets ($F_1$, $F_2$ and $F_3$) and a dedicated sub-channel set ($F_4$, $F_5$ or $F_6$). In FFRO, there are several common sub-channel sets and each cell follows specific rules to allocate sub-channel sets by its cell type. The number of the common sub-channel sets and the cell type is determined by the cluster size. Let N and M represent the number of sub-carriers and the cluster size, respectively.

In orthogonal frequency division multiplexing (OFDM) systems, all sub-carriers are indexed in a sequential manner, and then they are partitioned into 2M sub-channel sets by performing modulo M operations on their index numbers when the cluster size is M. Thus, the sub-channel sets are represented as $F_1, F_2, \ldots, F_m, \ldots, F_{2M}$.

For example, if M=3 and the sub-channel sets are $F_1, \ldots, F_{2M=6}$ in FIG. 2, the common sub-channel set $F_m$ is a set of sub-carriers as follows.

$$F_m = \{f_i | i \bmod M = m-1, 1 \leq i \leq pN\}, 1 \leq m \leq M \quad \text{Expression 1}$$

where $f_i$ and p are the index i sub-carrier and the ratio of the common sub-channel to the total sub-channel, respectively.

Similarly, the dedicated sub-channel set Fm is represented as follows.

$$F_m = \{f_i | i \bmod M = m - M - 1, pN < i \leq N\}, M < m \leq 2M. \quad \text{Expression 2}$$

The number of cell types is equal to the cluster size. In each cell type, the sub-channels are allocated sequentially to users in a specific order.

For the cell type s, the sub-channels are allocated sequentially as follows:

$$\text{Type s: } F_{M+s} \to F_{(s) \bmod M} \to F_{(s+1) \bmod M} \to F_{(s+2) \bmod M} \to \cdots \to F_{(s+M-1) \bmod M}$$

where $s \in \{1, 2, \ldots, M\}$, and F0 is equivalent to FM.

For example, for the cluster size of M=3, each sub-channel set is represented as $F_1$, $F_2$, $F_3$, $F_4$, $F_5$ and $F_6$. Each cell is either Type 1, Type 2 or Type 3. The order of allocation of sub-channel sets for each cell is determined as follows.

Type 1: $F_4 \to F_1 \to F_2 \to F_3$
Type 2: $F_5 \to F_2 \to F_3 \to F_1$
Type 3: $F_6 \to F_3 \to F_1 \to F_2$ For Type 1 cells, when a new call arrives, sub-carriers in $F_4$ are preferentially allocated to users first by a sub-carrier allocation algorithm. Then, it is started to allocate sub-carriers in $F_1$ after all sub-carriers in $F_4$ have been allocated to users. Then sub-carriers in $F_2$ and $F_3$ are allocated sequentially. For Type 2 and Type 3 cells, the same strategy is applied except the order of sub-channel sets allocation. FFRO can utilize either static or dynamic sub-carrier allocation to each user.

Next, results of performance evaluation of respective frequency reuse methods will be described through estimation of interference in systems to which FFRO according to an exemplary embodiment of the present invention and the conventional FFR are applied.

In order to capture the effect of interference, the interference is probabilistically estimated from neighboring cells when M=3. The probability that a sub-carrier in use in cell i is also used in cell j is represented as a function of $\lambda_i$ and $\lambda_j$.

$$\lambda_i = \frac{N_i^{use}}{N_i^{total}}, \lambda_j = \frac{N_j^{use}}{N_j^{total}} \quad \text{Expression 3}$$

where $N_i^{use}$ is the number of sub-carriers used in cell i and $N_i^{total}$ is the number of total sub-carriers for cell i.

Let $P[F_k^i]$ be the probability that an arbitrary sub-carrier used in cell i is in the sub-channel set $F_k$ ($1 \leq k \leq 6$), and the probability that the sub-carrier allocated to user in cell i is used in a neighboring cell j is defined as $P[T_{i,j}^{s_i,s_j}]$ where $s_i$ and $s_j$ represent the type of cell i and j, respectively.

For a given $\lambda_i$ and $\lambda_j$, the probability $P[T_{i,j}^{s_i,s_j}]$ can now be calculated.

For example, the probability that a sub-carrier used in cell I (Type 1) is also used in neighboring cell j (Type 2) is calculated as follows.

$$P[F_1^i] = \frac{p}{3\lambda_i}, \qquad P[F_2^i] = \frac{p}{3\lambda_i}, \qquad \text{Expression 4}$$
$$P[F_3^i] = \frac{3\lambda_i - 1 - p}{3\lambda_i}, \quad P[F_4^i] = \frac{1-p}{3\lambda_i},$$
$$P[F_5^i] = 0, \qquad P[F_6^i] = 0.$$

where $(1+p)/3 \leq \lambda_i \leq (1+2p)/3$ and $1/3 \leq \lambda_j \leq (1+p)/3$.

Likewise, the conditional probabilities can be calculated as follows.

$$P[T_{i,j}^{s_i,s_j} | F_1^i] = 0, \qquad P[T_{i,j}^{s_i,s_j} | F_2^i] = 1, \qquad \text{Expression 5}$$
$$P[T_{i,j}^{s_i,s_j} | F_3^i] = \frac{3\lambda_j - 1}{p}, \quad P[T_{i,j}^{s_i,s_j} | F_4^i] = 0,$$

-continued $$P[T_{i,j}^{s_i,s_j} \mid F_5^i] = 1, \qquad P[T_{i,j}^{s_i,s_j} \mid F_6^i] = 0.$$

Therefore, $P[T_{i,j}^{s_i,s_j}]$ can be calculated as follows.

$$P[T_{i,j}^{s_i,s_j}] = \sum_{k=1}^{2M} P[T_{i,j}^{s_i,s_j} \mid F_k^i] P[F_k^i], \qquad \text{Expression 6}$$

$$P[T_{i,j}^{s_i,s_j}] = \frac{(3\lambda_j - 1)(3\lambda_i - 1 - p) + p^2}{3p\lambda_i}.$$

In a similar manner, the interferences from each type of cell are found as a function of $\lambda_i$ and $\lambda_j$. It should be noted that $P[T_{i,j}^{s_i,s_j}]$ is represented in different forms according to the ranges of $\lambda_i$ and $\lambda_j$. Therefore, it is possible to compare the performance of FFR techniques by estimation of interference.

Figure 3:
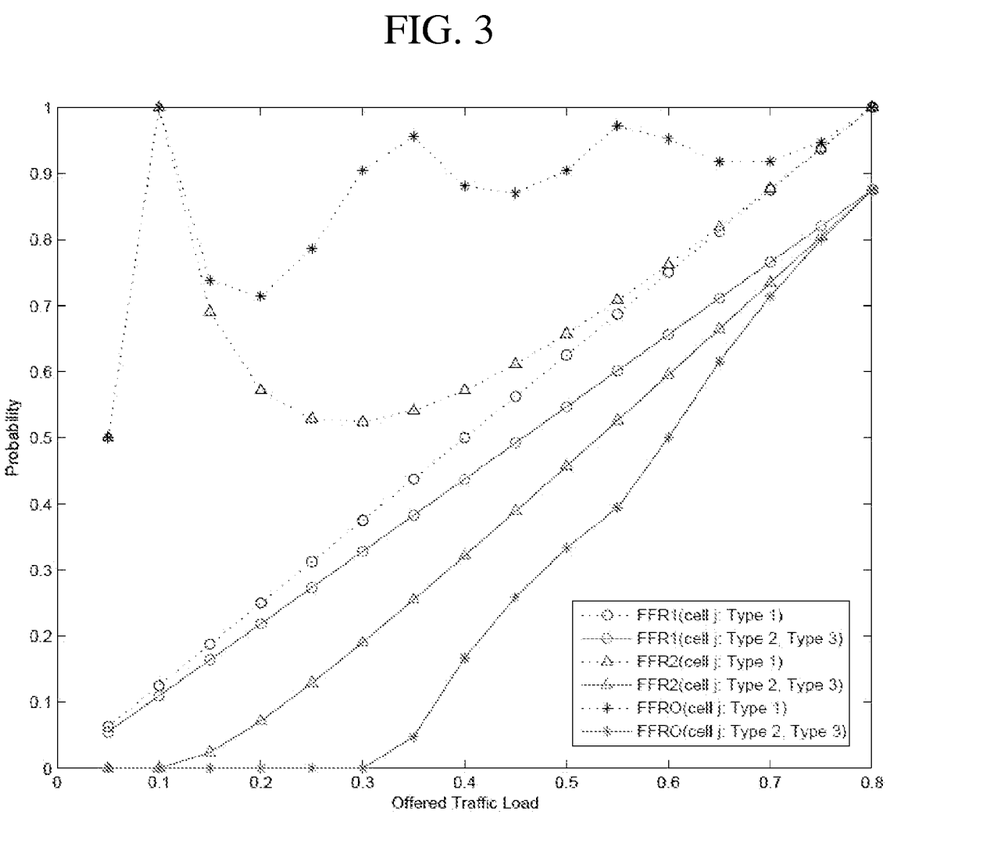
FIG. 3 shows probability that a sub-carrier allocated to a user in a cell i (type 1) is used in a neighboring cell j (type 2 or 3)

FIG. 3 shows the probability that a sub-carrier allocated to user in a cell i (type 1) is used in a neighboring cell j (type 2 or 3), i.e., the probability $P[T_{i,j}^{s_i,s_j}]$ when $s_i=1$; $s_j=2$; 3; $\lambda_i=\lambda_j$ and p=0.7.

To compare the performance of FFRO, two FFR schemes can be considered. FFR1 is a basic FFR scheme, and, in FFR2, dedicated sub-channels are preferentially allocated to users in a similar way to FFRO, but common sub-channels are not partitioned into some sub-channel sets as in FFRO.

In FIG. 3, in FFRO according to the embodiment of the present invention, the probability of interference occurrence decreases for both Type 2 and Type 3 cells, but increases for Type 1 cells. However, the effect of interference is not significant since in fact Type 1 cells j are located at tier-2 of cell i. Next, actual performance of FFRO according to the embodiment of the invention will be investigated by simulations.

First, the system model of the FFRO in OFDM systems will be described and simulation results under uniform and non-uniform traffic load distribution will be presented. Hereinafter, it will be assumed that $\lambda_j$ is a Gaussian random variable to model the traffic load of each cell. The mean of $\lambda_j$ is the same as that of $\lambda_i$. Considering mobile WiMAX systems, the link level parameters are set as follows:

carrier frequency=2.3 GHz,
sampling frequency=10 MHz,
FFT size=1024,
number of used sub-carriers=864,
number of data sub-carriers=768,
number of pilot sub-carriers=96, and
symbol rate=9.76 ksymbols/sec.

Also, OFDM allows different modulation schemes and error correction codes to be adapted to sub-carriers. Table 1 shows the modulation and coding scheme (MCS) table for this system.

TABLE 1

| Modulations | Code Rate | SIR |
|---|---|---|
| QPSK | 1/12 | −4.34 |
| QPSK | 1/8 | −2.80 |
| QPSK | 1/6 | −1.65 |
| QPSK | 1/4 | 0.13 |
| QPSK | 1/3 | 1.51 |
| QPSK | 1/2 | 4.12 |
| QPSK | 2/3 | 6.35 |
| 16QAM | 1/2 | 9.50 |

TABLE 1-continued

| Modulations | Code Rate | SIR |
|---|---|---|
| 16QAM | 2/3 | 12.21 |
| 64QAM | 1/2 | 13.32 |
| 64QAM | 2/3 | 16.79 |
| 64QAM | 5/6 | 20.68 |

For the system level simulation, the following parameters are used:

number of cells=19,
distance between base stations=1 km, and
transmission power at base station=20 W.

Considering the carrier frequency and the cell radius, COST-WI urban micro model is applied as a channel model. The standard deviation of $\epsilon$, $\sigma_\delta$, is set as 10 dB for non-line of sight environments.

$$PL(d)=31.81+40.5 \log(d)+\epsilon(3) \qquad \text{Expression 7}$$

Further, a random allocation mechanism, which allocates sub-carriers to users in a random manner, is used as a sub-carrier allocation algorithm.

Figure 4:
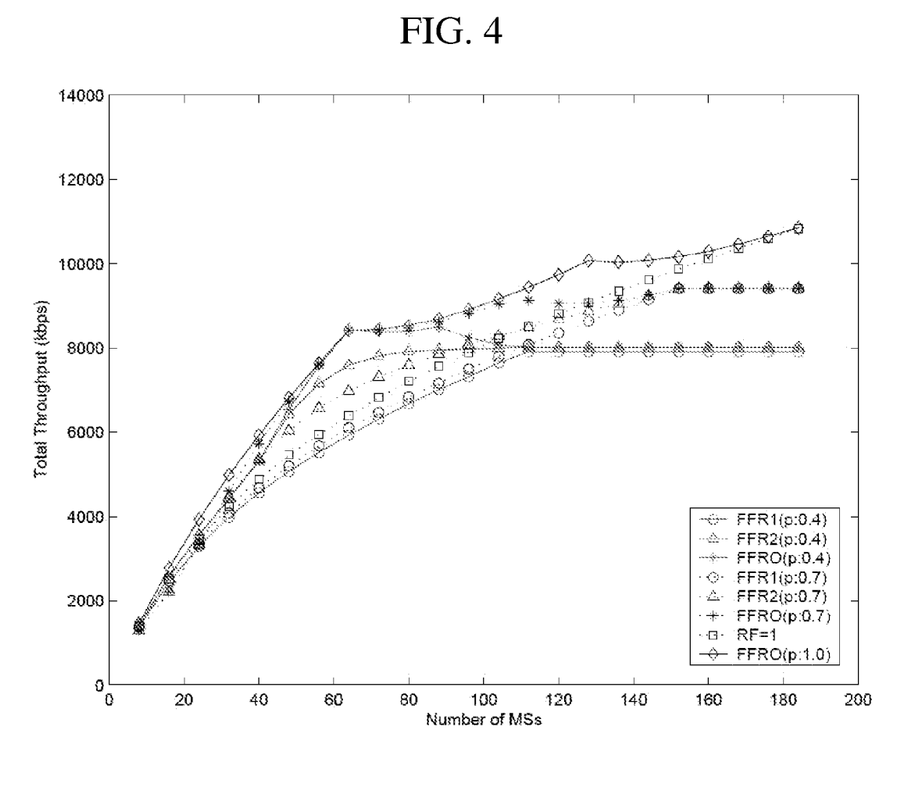
FIG. 4 shows total throughput of a cell 0 under uniform traffic load distribution.

FIG. 4 shows total throughput of a cell 0 under uniform traffic load distribution. As shown in FIG. 4, when p is 1, both FFR1 and FFR2 are operated as one-cell frequency reuse. FFRO has better performance under medium traffic load. Here, FFRO and FFR2 show the same performance for $$\lambda_0 < \frac{1-p}{3},$$

because dedicated sub-channels are allocated first in both FFRO and FFR2. When $\lambda_0$ is 1/3, total throughput of FFRO starts to decrease, because the interference from tier-1 cells starts to affect mobile stations in cell 0.

Figure 5:
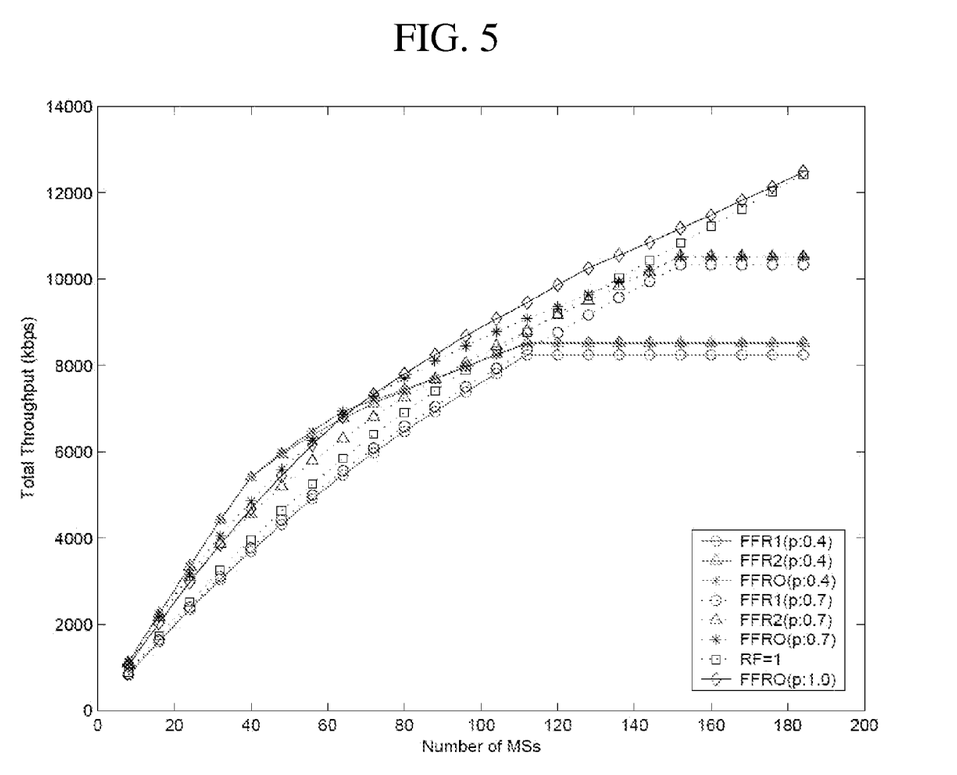
FIG. 5 shows total throughput of a cell 0 under non-uniform traffic load distribution (variance=0.1)

FIG. 5 shows total throughput of a cell 0 under non-uniform traffic load distribution (variance=0.1). In FIG. 5, the mean and variance represents the mean and variance of $\lambda_j$.

Under uniform traffic load distribution, the probability of interference occurrence is almost 0 under light traffic load, but 1 at heavy traffic load. The FFR techniques provide equal performance under light and heavy traffic load. However, under non-uniform traffic load distribution as shown in FIG. 5, FFRO shows improved throughput performance in all traffic regions since the order of sub-channel sets allocation reduces interference. Both FIG. 4 and FIG. 5 show that FFRO increases system throughput significantly, when p, the ratio of common sub-channels to total sub-channels, is high.

Figure 6:
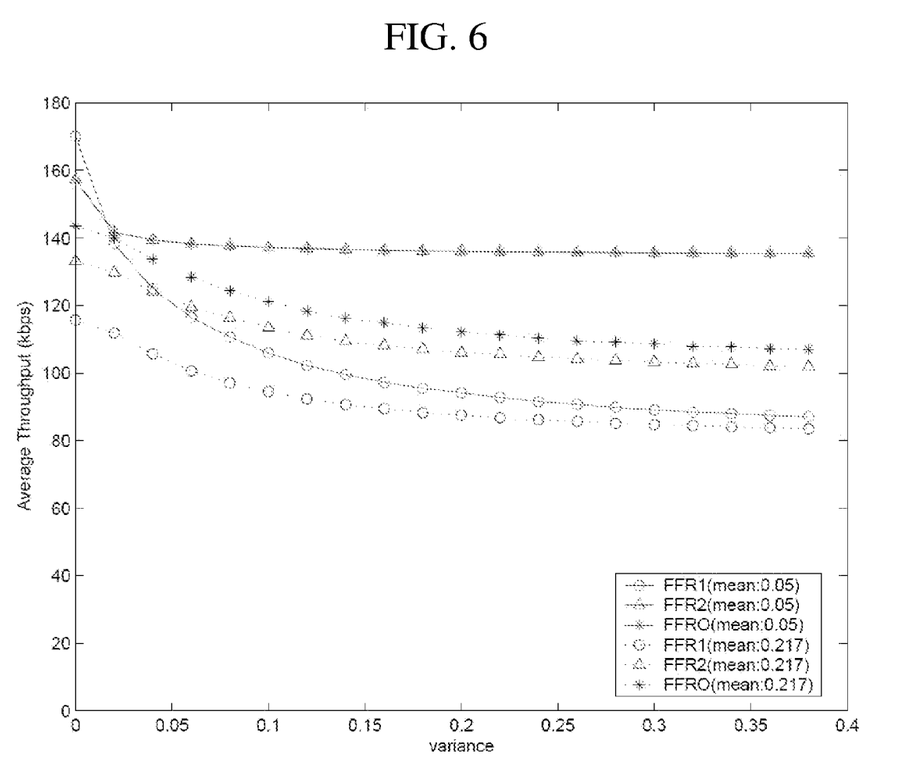
FIGS. 6 and 7 show average throughput of a user with respect to traffic load distribution.
Figure 7:
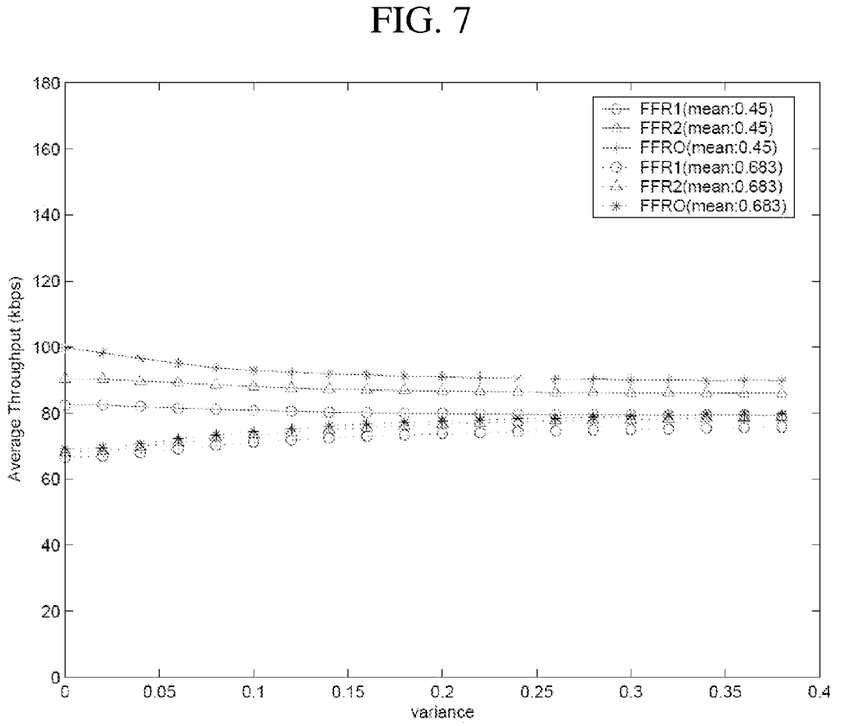

FIGS. 6 and 7 show average throughput of a user with respect to traffic load distribution. In FIG. 6 and FIG. 7, the mean and variance represent the mean and variance of $\lambda_j$. Since the average throughput of a user is affected by traffic load, considering 4 sub-channel groups of FFRO, the performance is evaluated at the median of each traffic region. In the low traffic condition, since the users of both FFRO and FFR2 use sub-carriers only in the dedicated sub-channel set, FFRO and FFR2 exhibit the same performance. The ordered allocation of common sub-channel sets starts to affect the throughput results after all sub-carriers in the dedicated sub-channel set have been allocated to users. Therefore, FFRO improves the performance of FFR for both uniform and non-uniform traffic load distribution under medium traffic load.

As apparent from the above description, according to the embodiments of the present invention, the method for FFRO to increase capacity of OFDM systems has remarkable effects of reducing interference between channels while improving the performance of OFDM systems. In more detail, FFRO according to the embodiments of the invention effectively designs the allocation order of the sub-channel set and the sub-channels for specific cell types according to ordering scheme, thereby reducing the amount of interference in the common sub-channel sets while improving system throughput significantly under both uniform and non-uniform traffic load distribution between cells. Particularly, FFRO of the invention provides a significant increase in system throughput when the ratio of common sub-channels to total sub-channels is high.

Although the present invention has been described with reference to the embodiments and the accompanying drawings, it should be understood that the embodiments are given by way of illustration and that various modifications and equivalent embodiments can be made without departing from the spirit and scope of the present invention as defined only by the accompanying claims.

What is claimed is:

1. A method for fractional frequency reuse with ordering scheme (FFRO) to increase capacity of orthogonal frequency division multiplexing (OFDM) systems, in which the frequency includes a common sub-channel set assigned in common to all cells provided in a cluster and a dedicated sub-channel set assigned differently to all of the cells, the method comprising:
    classifying the cells into at least one type according to cluster sizes; and
    allocating the dedicated sub-channel set by frequency partitioning scheme based on the cell type.

2. The method according to claim 1, wherein the number of cell types is equal to the cluster size.

3. The method according to claim 1, wherein the allocating the dedicated sub-channel set by the frequency partitioning scheme based on the cell type comprises:
    indexing all sub-carriers of each cell in a sequential manner; and
    partitioning every sub-carrier into 2M sub-channel sets by performing modulo M operations on an index number thereof, where M is the cluster size.

4. The method according to claim 3, wherein the partitioning every sub-carrier into 2M sub-channel sets by performing modulo M operations on an index number thereof comprises:
    partitioning the sub-carrier with regard to a common sub-channel set $F_m$ through operation of $F_m = \{f_i | i \bmod M = m-1, 1 \leq i \leq pN\}$, $1 \leq m \leq M$,
    where $f_i$ and p are an index i sub-carrier and a ratio of the common sub-channel to total sub-channels, respectively.

5. The method according to claim 3, wherein the partitioning every sub-carrier into 2M sub-channel sets by performing modulo M operations on an index number thereof comprises:
    partitioning the sub-carrier with regard to a dedicated sub-channel set $F_m$ through operation of $$F_m = \{f_i \mid i \bmod M = m - M - 1, pN < i \leq N\}, M < m \leq 2M.$$

6. The method according to claim 3, further comprising:
    allocating the sub-channels in a specific order for the cell type s after partitioning every sub-carrier into 2M sub-channel sets by performing modulo M operations on an index number thereof, the specific order being as follows:

Type s: $F_{M+s} \rightarrow F_{(s) \bmod M} \rightarrow F_{(s+1) \bmod M} \rightarrow F_{(s+2) \bmod M} \rightarrow \ldots \rightarrow F_{(s+M-1) \bmod M}$ where $s \in \{1, 2, \ldots, M\}$.

7. The method according to claim 6, wherein for a cluster size of M=3, the respective sub-channel sets represented by $F_1, F_2, F_3, F_4, F_5$ and $F_6$ are allocated to a user in order of
    Type 1: $F_4 \rightarrow F_1 \rightarrow F_2 \rightarrow F_3$,
    Type 2: $F_5 \rightarrow F_2 \rightarrow F_3 \rightarrow F_1$, and
    Type 3: $F_6 \rightarrow F_3 \rightarrow F_1 \rightarrow F_2$.

* * * * *

UNITED STATES PATENT AND TRADEMARK OFFICE
CERTIFICATE OF CORRECTION

PATENT NO. : 8,009,624 B2  
APPLICATION NO. : 12/371974  
DATED : August 30, 2011  
INVENTOR(S) : Tae Jin Lee and Seung Moo Cho It is certified that error appears in the above-identified patent and that said Letters Patent is hereby corrected as shown below:

Title Page; item (54) and Col. 1, lines 1-3

"METHOD FOR FRACTIONAL FRQUENCY REUSE WITH ORDERING SCHEME TO INCREASE CAPACITY OF OFDM SYSTEMS"

should be

"METHOD FOR FRACTIONAL FREQUENCY REUSE WITH ORDERING SCHEME TO INCREASE CAPACITY OF OFDM SYSTEMS"

Signed and Sealed this  
Fourth Day of October, 2011

David J. Kappos  
*Director of the United States Patent and Trademark Office*